United States Patent [19]
Ainsworth

[11] Patent Number: 4,558,405
[45] Date of Patent: Dec. 10, 1985

[54] MULTI-LOOP CONTROL SYSTEM FOR AN AC/DC CONVERTER EMPLOYING MODE SWITCHING

[75] Inventor: John D. Ainsworth, Stafford, England

[73] Assignee: Associated Electrical Industries Limited, England

[21] Appl. No.: 575,516

[22] Filed: Jan. 31, 1984

[30] Foreign Application Priority Data

Feb. 9, 1983 [GB] United Kingdom ............... 8303551

[51] Int. Cl.⁴ ............................................. H02P 13/26
[52] U.S. Cl. ......................................... 363/81; 363/87
[58] Field of Search ................... 363/35, 81, 87, 129, 363/83; 307/571, 228; 328/154, 133

[56] References Cited

U.S. PATENT DOCUMENTS

| | | | |
|---|---|---|---|
| 3,466,525 | 9/1969 | Ainsworth | 363/35 |
| 3,832,620 | 8/1974 | Pollard | 363/129 |
| 3,863,134 | 1/1975 | Pollard | 363/129 |

FOREIGN PATENT DOCUMENTS

| | | |
|---|---|---|
| 1170248 | 11/1969 | United Kingdom . |
| 1171953 | 11/1969 | United Kingdom . |
| 1170249 | 11/1969 | United Kingdom . |
| 1275764 | 5/1972 | United Kingdom . |
| 1300226 | 12/1972 | United Kingdom . |
| 1302544 | 1/1973 | United Kingdom . |
| 1365817 | 9/1974 | United Kingdom . |
| 1388824 | 3/1975 | United Kingdom . |
| 1389697 | 4/1975 | United Kingdom . |
| 1547121 | 6/1979 | United Kingdom . |

OTHER PUBLICATIONS

Skjellnes et al., "Phase-Locked Loop Control of Thyristor Converters," Proc. IEE, vol. 123, No. 10, pp. 999–1001, Oct. 1976.

Primary Examiner—William H. Beha, Jr.
Attorney, Agent, or Firm—Kirschstein, Kirschstein, Ottinger & Israel

[57] ABSTRACT

A multi-loop control system for convertors of the kind used in h.v.d.c. transmission and industrial applications. The invention consists in a control circuit which effects transfer between two or more control loops, e.g. a constant-current loop and a constant $\alpha$ loop, in a smooth and precise manner, without extra smoothing lags, even in the presence of ripple in the controlled quantities.

8 Claims, 10 Drawing Figures

MULTI-LOOP CONTROL SYSTEM FOR AN AC/DC CONVERTER EMPLOYING MODE SWITCHING

This invention relates to a.c./d.c. convertors employing phase-controlled valves, for example thyristors, in which firing angle control is effected according to one of a number of different operating parameters.

British Pat. No. 1,170,248 describes a control system for use with an a.c./d.c. convertor having, for example, six thryistors (or thyristor valves) forming a 3-phase bridge circuit, as used for h.v.d.c. transmission or for industrial loads. This type of control system is known as the phase-locked oscillatory type and as described therein contains a voltage-controlled oscillator and a ring counter.

FIG. 1 of the accompanying drawings shows the general arrangement. Thryistors 1-6 are supplied from an a.c. system 7 via a transformer 8, and give a d.c. output to a load at terminals 9. The control system includes a voltage-controlled oscillator 10 and a 6-stage ring counter 11. The oscillator is supplied at its control input via an adder 12 with signals proportional respectively to; measured d.c. output current from the converter (via d.c. current transformer 13 and sign reversing amplifier 14), a current order signal from a reference source 34, and a d.c. bias voltage, which, in this prior art arrangement is fixed, from a bias source 35.

In normal steady state operation the oscillator 10 operates at a frequency of 6 times supply frequency, and each output stage 1-6 of the ring counter 11 delivers a pulse in turn to fire the thyristor of corresponding number. The voltage required by the oscillator at its control input is normally equal to the fixed bias, the d.c. current and current order signals being effectively equal and opposite. The system is one of negative feedback, tending to control d.c. current output in proportion to current order.

The oscillator 10 includes an integrator 15, a level detector 16, and a short-pulse generator 17. FIG. 2 shows waveforms for this. The integrator output 15' rises at a rate proportional to its control input signal, until it reaches the setting $V_1$ of the level detector 16; the latter then operates to trigger the pulse generator 17, which delivers an output pulse 17' to the ring counter, and simultaneously resets the integrator 15 to zero. The cycle of operation then repeats.

The arrangement shown can operate the convertor at a firing angle corresponding to rectification or inversion, the latter being for the case where power is received from the d.c. system. Phase limit circuits (not shown) are normally used, as described in British Pat. No. 1,170,249 to provide limits to the firing angle and to prevent loss of synchronism of the oscillator during transients. Control systems can be made also for convertors of higher pulse number, e.g. 12, for which the oscillator operates at 12 times supply frequency, and drives a 12-stage ring counter.

As shown in FIG. 1, the arrangement is a single-loop control system, controlling in dependence upon d.c. current as the controlled operating parameter in this case. It is also known from British Pat. No. 1171953 to use a similar arrangement to control the extinction angle (gamma) of a convertor operating in the inversion mode. Other control modes, for example for constant firing angle (alpha) are often required.

By 'firing angle' is to be understood the angle by which firing of a thyristor is delayed beyond the natural firing angle at which a diode would conduct. The 'extinction angle' is the angle for which a thyristor is non-conductive before its anode/cathode voltage is again positive.

It is a common requirement for several different modes to be available in a convertor, and for operation to transfer smoothly and automatically from one to another according to the value of various working parameters, for example d.c. current. FIG. 3 of the accompanying drawings shows a typical d.c. voltage/d.c. current characteristic of an inverter as an example. In region AB the control mode is for constant-alpha, at $\alpha = 120°$. In region BC the control mode is of constant current, equal to a current order signal as described above. In region CD the control mode is of constant-gamma, at $\gamma = 15°$.

A common means for effecting the hand-over of control from one mode to another is to connect the error signals for the various modes, i.e., signals proportional to the difference between measured and ordered values, via a diode combining circuit or the equivalent, to the adder 12 in FIG. 1, such that only one error signal is effectively in control at a time.

Since all the quantities likely to be required to be measured for control purposes either contain ripple (e.g. in the case of d.c. current) or occur at discrete times, requiring sample-and-hold or mark/space measuring methods ($\alpha$ or $\gamma$), the above methods normally require smoothing to produce substantially d.c. error signals before the diode combining circuit. All smoothing and sample-and-hold methods introduce lag in the control loops, which is detrimental to system stability, and slows overall response time to transients. Omission of smoothing is feasible but causes a gradual transition from one mode to another, which is usually undesirable.

It is an object of the present invention to provide means to change operation smoothly and automatically between control modes without the addition of signal smoothing, and without undesired gradual transition.

According to the present invention, in a control system for an a.c./d.c. convertor employing phase-controlled valves, the control system comprising an oscillator the output pulses of which determine the phase of firing pulses to said valves, the oscillator has a plurality of integrators, each integrator having a respective control input dependent upon a respective operating parameter of the convertor, the oscillator further including gate means arranged to select from said control inputs in dependence upon the magnitude of the associated operating parameter for control of the oscillator phase in such manner as to tend to maintain the selected operating parameter constant.

The operating parameters may include the d.c. current for the convertor and the extinction angle of the convertor valves, the gate means then being arranged to select the corresponding control input tending to produce the smaller firing angle.

Again, the operating parameters may include the firing angle of the convertor valves, the gate means then being arranged to select the control input corresponding to the firing angle parameter when that control input is such as to produce a greater firing angle than the control input associated with any other parameter.

Each control input may incorporate a frequency dependent bias component arranged to counteract the effect of frequency on the operating parameters. Alternatively, where the oscillator comprises at least one level detector responding to an integrator output, there may be provided means for controlling the detection level of the level detector in dependence upon the period of the a.c. system so as to counteract the effect of frequency on the operating parameters.

Several versions of a control system for an a.c./d.c. convertor in accordance with the invention will now be described, by way of example, with reference to the accompanying drawings, of which:

Figure 1:
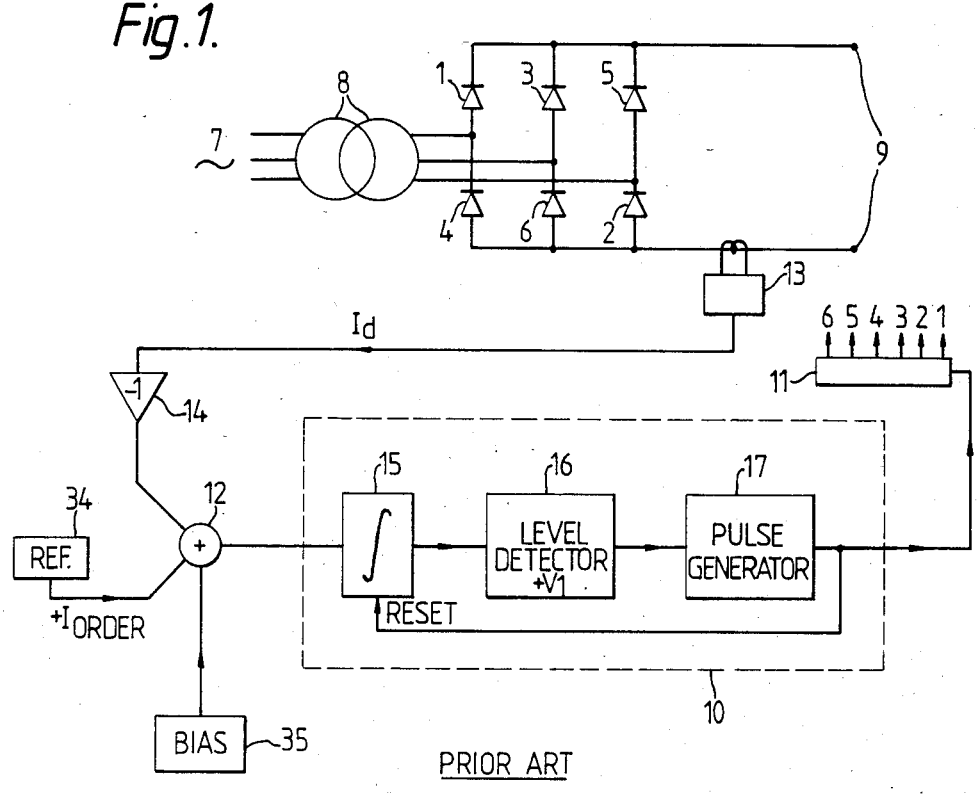
FIG. 1 shows diagrammatically, a prior art convertor controlled in known manner by a phase-locked oscillator.
Figure 2:
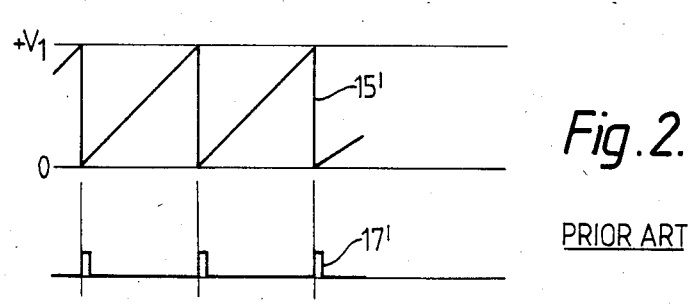
FIG. 2 shows waveforms illustrating the operation of the control system of FIG. 1.
Figure 4:
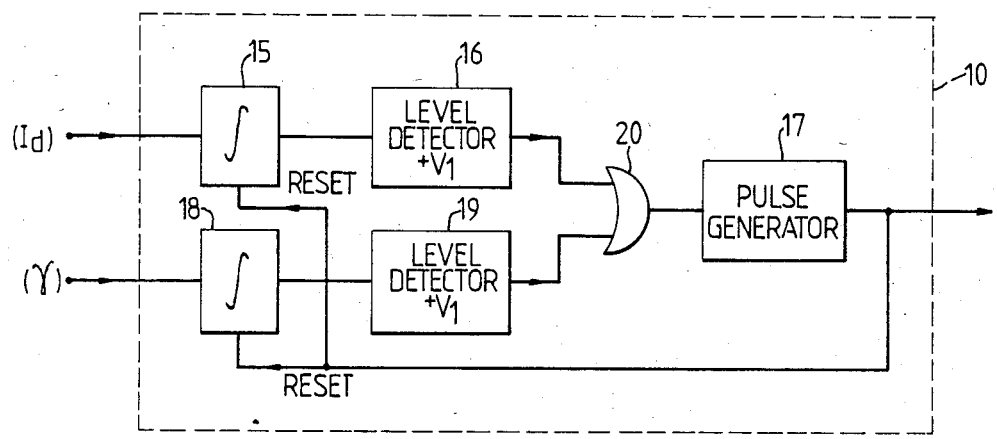
FIG. 4 shows diagrammatically a control system in accordance with the invention, providing control according to the modes BC and CD of FIG. 3.

Referring now to FIG. 4 of the drawings, this shows part of a two-loop form of the invention, which may be referred to as type A. This shows the oscillator 10 only, which now contains an extra integrator 18, an extra level detector 19, and a logic OR gate 20. Each integrator has control inputs (not shown) but similar to those in FIG. 1. Thus, a current order input signal Id is derived from a transformer 13 as before, and an extinction angle signal $\gamma$ derived from the zero current condition of the thyristors. The reset signal is applied to both integrators simultaneously. The remainder of the system is not shown but is generally as FIG. 1.

Figure 5:
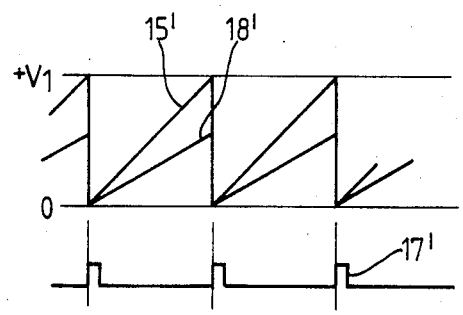
FIG. 5 shows waveforms illustrating the operation of the system of FIG. 4.

FIG. 5 shows waveforms for a particular system condition in which the net signal at the input to integrator 15 is more positive than that at the input of integrator 18. Since the output (15') of integrator 15 then rises more rapidly than that (18') of integrator 18, it reaches its level detector setting earlier, triggering the pulse generator via OR-gate 20. The signals applied to integrator 15 are in this case effectively in control, and those to integrator 18 have no effect, unless conditions change such that the input to 18 becomes relatively higher than that to 15, when the situation is reversed.

The integrator waveforms in FIG. 5 are for an imaginary case where the measured quantities are pure d.c. For a practical case where the measured quantities contain ripple, or are mark/space type signals, the integrator outputs will not be exactly linear ramps, but one of these will nevertheless similarly reach the setting of its level detector first and will be in control. The control is effectively of the mean value of the relevant measured quantity, the integrator action being equivalent to an averaging process.

Figure 3:
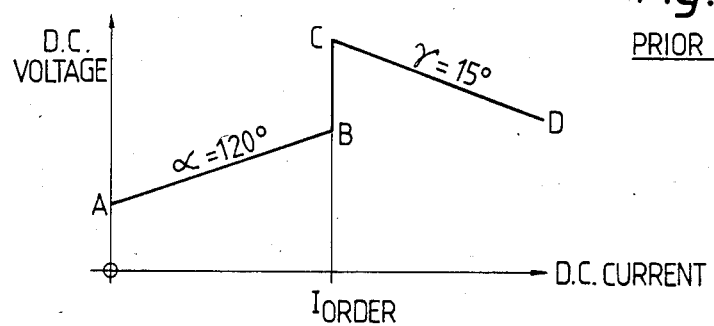
FIG. 3 shows a typical 3-mode voltage/current characteristic of an inverter.

A type A system shown gives control to the loop which demands the smallest firing angle. It is suitable, for example, for a combination of a constant-current loop and a constant-$\gamma$ loop (regions BC and CD of FIG. 3).

Figure 6:
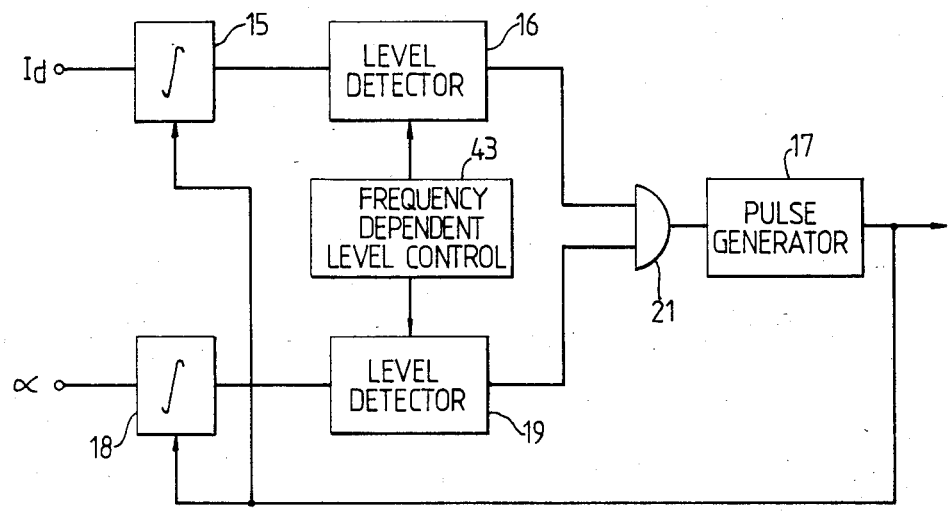
FIG. 6 shows an alternative control system providing control according to the AB & BC modes of FIG. 3.
Figure 7:
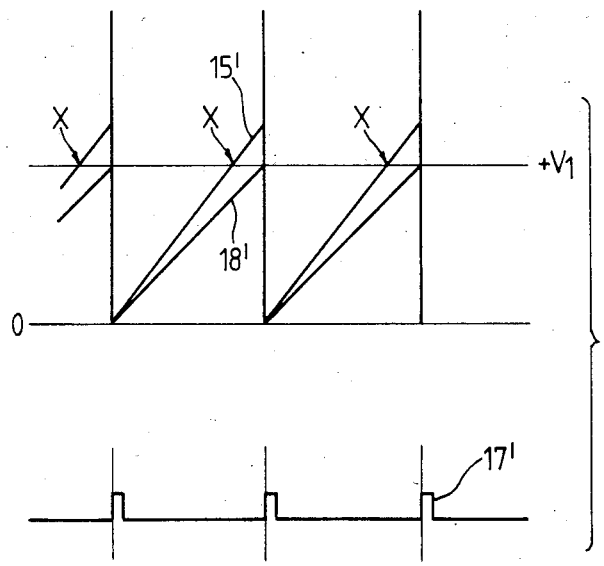
FIG. 7 shows waveforms associated with the control system of FIG. 6.

FIG. 6 shows a modification of FIG. 4 in which the OR-gate 20 is replaced by an AND-gate 21. FIG. 7 shows the waveforms for the case where the net input to integrator 15 is relatively more positive than that to integrator 18. In this case the output (15') of integrator 15 rises past its level detector setting at X but the pulse generator 17 is not triggered until integrator 18 output (18') reaches its level detector setting. In this example it is the input to integrator 18 which is effectively in control.

For this type of control (Type B) it is the loop which demands the larger firing angle which is effectively in control. This type is suitable for example for a combination of a constant-$\alpha$ loop and a constant-current loop (regions AB and BC in FIG. 3).

As explained subsequently, variation of the a.c. frequency can upset the stability of the parameter control. One arrangement compensating for this variation is shown in FIG. 6 and consists in using a frequency dependent level setting circuit 43.

Either of types A or B controls as above can be adapted to more than two control loops by an appropriate increase in the number of integrators, level detectors, and inputs to the OR or AND gates.

Figure 8:
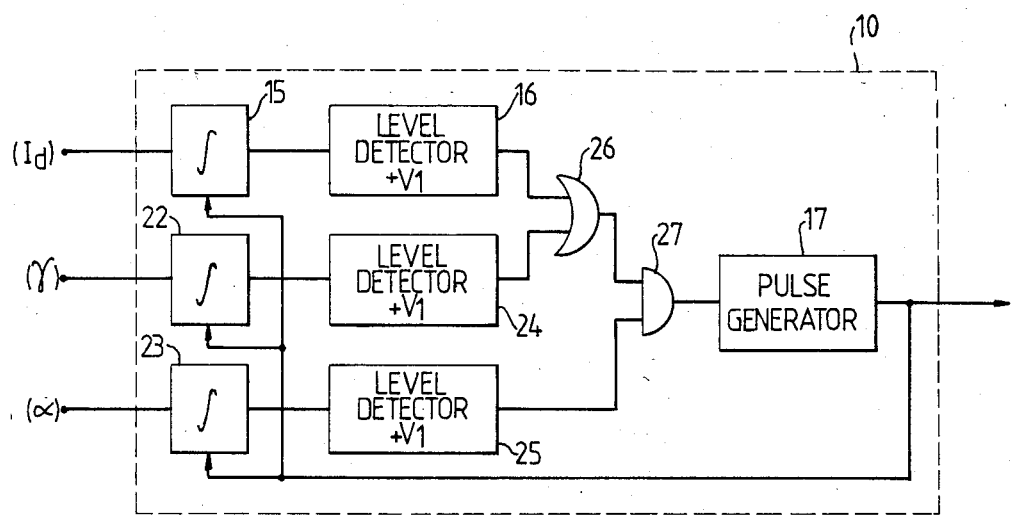
FIG. 8 is a diagram of a further alternative control system providing operation according to the complete characteristic of FIG. 3, and FIGS. 9 and 10 show modifications of FIGS. 4 and 6 respectively, in which diode gates are employed to permit the use of a single level detector and effect the essential gating at the same time.

It is also possible to mix type A and B controls. FIG. 8 shows as an example an arrangement for a 3-loop system, which can be used for the respective control modes of constant current, constant $\gamma$, and constant $\alpha$ to give the complete convertor characteristic ABCD in FIG. 3. This circuit includes three integrators 15, 22, 23, three level detectors 16, 24, 25, OR gate 26, and an AND gate 27.

Figure 9:
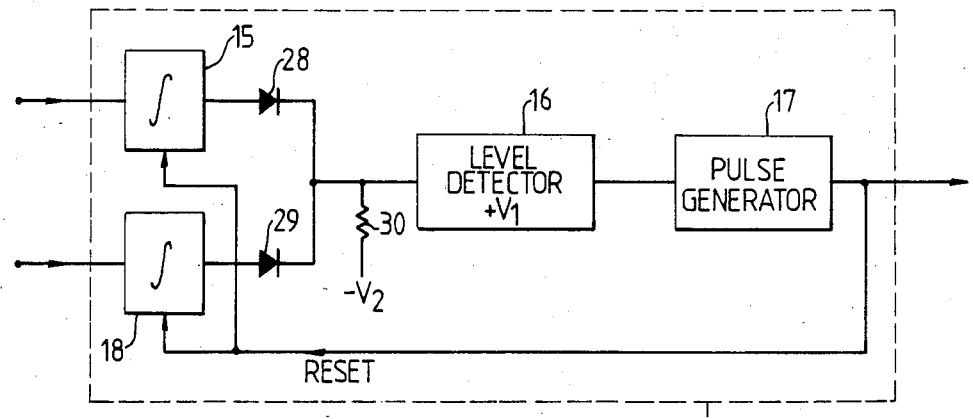

FIG. 9 shows a simplification of FIG. 4 in which the second level detector and the OR gate are replaced by diodes 28, 29, and resistor 30 connected to a negative voltage $V_2$. The voltage at the level detector input is substantially equal to the higher of the outputs from the two integrators, hence the integrator having the more positive input will be effectively in control as before.

Figure 10:
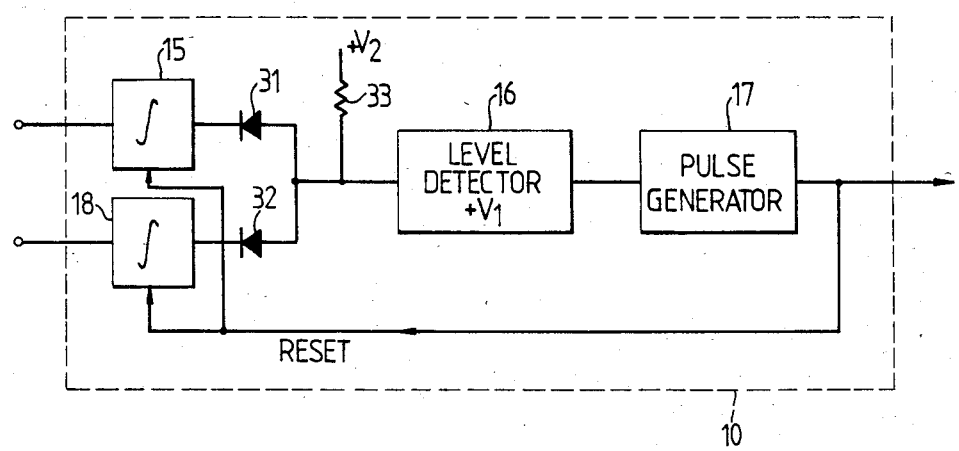

FIG. 10 shows a similar modification, but with the diode connections, and the polarity of voltage $V_2$, all reversed. The voltage at the level detector input is substantially equal to the lower of the outputs from the two integrators, giving an AND-gate performance similar to that of FIG. 6.

The voltage at the control input to the integrator which is in control will in steady state operation adjust to a value proportional to supply frequency. Thus if frequency changes, the system will normally adjust the controlled quantity to a value which is in error from the ordered value. This may be avoided by arranging that the bias source 35 (FIG. 1) derives its bias voltage from any known frequency-measuring circuit which is supplied from the a.c. voltage, and gives an output proportional to frequency.

As explained with reference to FIG. 6, an alternative frequency-correcting effect may be obtained by arranging the reference votlage $V_1$ which sets the level detector settings to be proportional to a.c. system period, by deriving it from any known form of period-measuring device.

Either correcting arrangement can be employed in any of the control systems described.

I claim:

1. A control system for an a.c./d.c. convertor employing phase-controlled valves, the control system comprising an oscillator providing output pulses for determining the phase of firing pulses to said valves, said oscillator including a plurality of integrators, a respective control input for each of said integrators, each said control input being dependent upon an associated operating parameter of the convertor, said oscillator further including level detector means responsive to the output level of each of said integrators for determining the timing of said firing pulses and gate means for selecting from said control inputs in dependence upon the magnitude of said associated operating parameter for controlling, in conjunction with said level detector means, the phase of said firing pulses and maintaining the selected operating parameter constant.

2. A control system according to claim 1, wherein said operating parameters include the d.c. current of the convertor and the extinction angle of said convertor valves, said gate means selecting a control input producing the smaller firing angle.

3. A control system according to claim 1, wherein said operating parameters include the firing angle of said convertor valves and said gate means selects the control input producing the greater firing angle.

4. A control system according to claim 2, wherein said gate means comprises a diode OR-gate.

5. A control system according to claim 3, wherein said gate means comprises a diode AND-gate.

6. A control system according to claim 3, wherein said gate means comprises an OR-gate for selecting the greater of two control inputs, associated with the convertor d.c. current and the valve extinction angle, and further comprises a two-input AND-gate input of said AND-gate being derived from the output of said OR-gate and the other input of said AND-gate being derived from the firing angle parameter.

7. A control system according to claim 1, comprising frequency responsive means providing a bias component for incorporation with each of said control input for counteracting the effect of variation of frequency on said operating parameters.

8. A control system according to claim 1, said oscillator comprising a level detector for each said integrator for detecting when the output signal of the integrator reaches a detection level, and means for adjusting said detection level in dependence upon the a.c. frequency.

* * * * *